No. 728,836. PATENTED MAY 26, 1903.
A. R. BEAL.
REGISTER.
APPLICATION FILED OCT. 16, 1902.
NO MODEL.
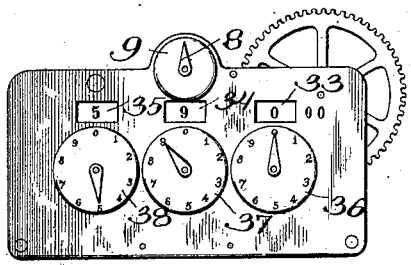
Fig. 1.
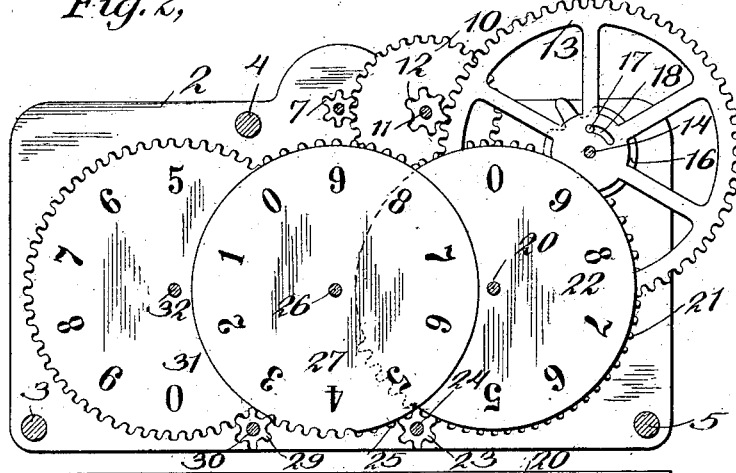
Fig. 2.
Fig. 3.
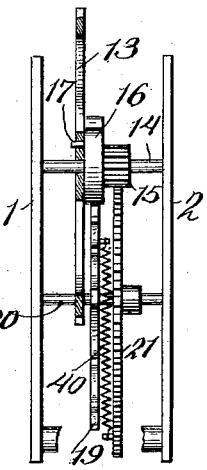
Fig. 5.
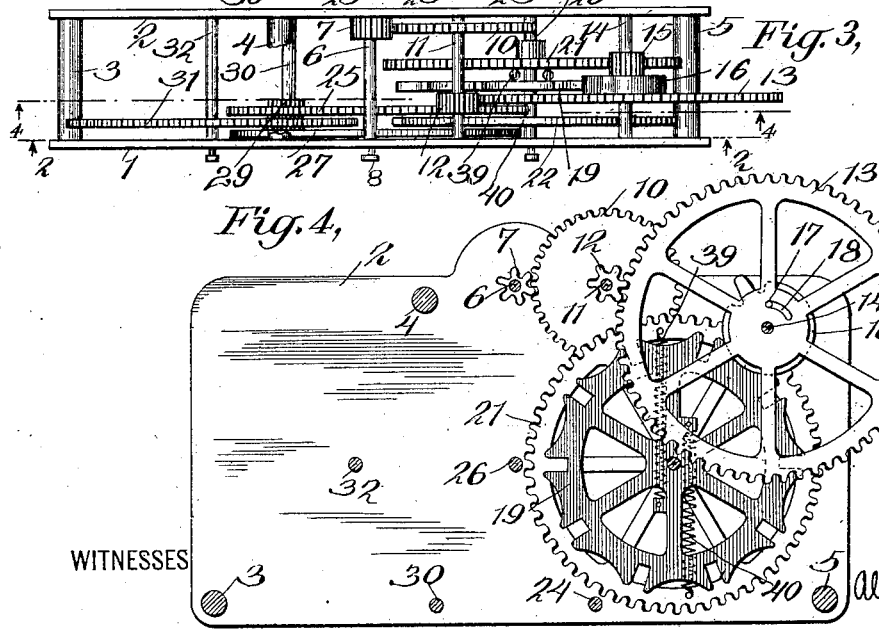
Fig. 4.
WITNESSES
Emma L. Carmichael
Frank M. Barron
INVENTOR
Albert R. Beal
BY
Nicholas M. Goodlett Jr.
his ATTORNEY No. 728,836. Patented May 26, 1903.

UNITED STATES PATENT OFFICE.

ALBERT R. BEAL, OF CAMBRIDGE, MASSACHUSETTS.

REGISTER.

SPECIFICATION forming part of Letters Patent No. 728,836, dated May 26, 1903.

Application filed October 16, 1902. Serial No. 127,482. (No model.)

*To all whom it may concern:*

Be it known that I, ALBERT R. BEAL, a citizen of the United States, and a resident of Cambridge, in the county of Middlesex and State of Massachusetts, have invented certain new and useful Improvements in Registers, of which the following is a specification.

This invention relates to registers for measuring purposes, and in the embodiment of the invention herein set forth is more particularly designed and constructed for use in measuring the flow of gas and other fluids.

The invention seeks, among other things, to provide a register which may be correctly and readily read even by the unskilled, whose mechanism is positive and reliable and not liable to get out of order, which is sensitive to delicate pressure of the medium to be measured, which is composed of few parts and compactly arranged, and which does not materially vary the resistance offered to the medium to be measured.

The invention consists of the combination of features hereinafter set forth.

In the accompanying drawings I have illustrated one embodiment of my invention in the form of a register designed more particularly for measuring gas. It is to be understood, however, that the combination of features, or some of them, may be used for such other purposes as their principle or mode of operation adapts them and without departing from the scope of my invention.

In the drawings forming part of this specification, and in which like reference-numerals designate corresponding parts in the several views, Figure 1 is a front elevation of a register embodying the invention. Fig. 2 is a sectional elevation on line 2 2 of Fig. 3. Fig. 3 is a plan view. Fig. 4 is a sectional elevation on line 4 4 of Fig. 3, and Fig. 5 is an end elevation of Fig. 4 looking in the direction of the arrow.

1 and 2 are the front and back plates of the register, secured together by suitable pillars 3, 4, and 5. The initial spindle 6, on which is fixed the pinion 7, is actuated by the fluid or other thing to be measured and carries a hand 8, turning on a dial 9 on the face-plate 1. Each rotation of the spindle 6 indicates on the dial 9 the flow of two feet of gas. This spindle through its six-toothed pinion 7 gears with wheel 10, fixed on spindle 11, which carries pinion 12, gearing with wheel 13, fixed on spindle 14, which carries pinion 15. This train of gearing constitutes mechanism actuated by the fluid or thing to be measured. The spindle 14 carries a wheel 16, free to make a partial rotation thereon. Various means may be employed for thus connecting the wheel 16 with its spindle 14. In the preferred arrangement, as shown, this is accomplished by the pin 17, fixed on the gear-wheel 16 and entering a slot 18 in the wheel 13, the wheel 16 being movable on the spindle as far as the pin moves in the slot. The wheel 16 has one tooth, but otherwise has a smooth periphery and engages the wheel 19, fixed on the spindle 20. The wheels 16 and 19 are of the type known as "Geneva" gears. Fast on the spindle 20 is another wheel 22, which has five teeth and a periphery otherwise smooth.

23 is a pinion fixed on the spindle 24 and engaged by the wheel 22 and meshing with the gear-wheel 25, fixed on the spindle 26, which spindle also carries the fixed five-toothed wheel 27, similar to wheel 22. The wheel 27 engages the pinion 29, fixed on the spindle 30, and the pinion 29 meshes with and drives the gear-wheel 31, fixed on the spindle 32.

The spindles 20, 26, and 32 carry the disks or wheels on which are marked the counting characters of the register displayed through the windows 33, 34, and 35. These same spindles may also, as shown in Fig. 1, carry hands, which move over dials 36, 37, and 38 in unison with the counter-wheels. In the simplest arrangement these counter-wheels are provided by marking the counting characters directly on the wheels 22, 27, and 31. In this way I avoid the necessity of having extra counter-wheels in addition to the wheels 22, 27, and 31, these wheels being thus made to serve a double purpose.

It is to be noted that at each tenth step of the wheel 22 or upon the end of each rotation its teeth mesh with and drive the pinion 23 one complete rotation, which in turn drives the wheel 25, thereby causing the counter-wheel 27 to move a tenth of a rotation or one step. Likewise at each tenth step of the wheel 27 or upon the end of each rotation its teeth mesh with and drive the pinion 29 one complete rotation, which in turn drives the counter-wheel 31 one-tenth of a rotation or one step. Thus the tens-of-thousands counter-wheel 31 moves one step upon a predetermined movement or the tenth step of the thousands-wheel 27, and the thousands-wheel 27 moves one step upon a predetermined movement or the tenth step of the hundreds-wheel 22. It is also to be noted that the pinion 29 when not engaged by the teeth of wheel 27 is locked by the smooth periphery of this wheel and so at this time locks the counter-wheel 31. In the same way the pinion 23 is locked by the smooth periphery of the wheel 22 and so at this time locks the counter-wheel 27.

From the foregoing description it will be seen that the visual counter-wheels are connected in a train of gearing, so that a predetermined movement of one counter-wheel imparts movement to the next counter-wheel and that this train intermittently meshes and locks.

39 is a coiled spring having one end secured to the loose wheel 21, carried on spindle 20, and its other end secured to wheel 19. 40 is a similar spring similarly arranged. One spring of course might be used, but two springs are preferred, because chance of breakage is thereby lessened. As gear 13 and pinion 15 rotate the wheel 21 is simultaneously actuated, and thus serves to slowly extend or energize the springs 39 and 40, which thus exert their force to actuate the Geneva gear 19; but the wheel 19 is locked by the Geneva wheel 16 until its tooth meshes with the wheel 19, at which time the wheel 19 is released and moves forward one step, or a tenth of a rotation, by a snap action due to the springs 39 and 40. This movement of the wheel 19 carries forward the wheel 16 as far as the circumferential locking-surface of the wheels will permit. The movement of the wheel 19, as already shown, moves the counter-wheel 22 one step. Thus it will be seen that the springs impart a snap action to the movement of all the counter-wheels, which, as shown above, are connected in the same train of gearing. The wheel 16 not only locks and releases the wheel 19, but if the springs 39 and 40 should break the wheel 16 is capable of positively driving the wheel 19, so that the operation of the register would continue as before, except that there would be no snap action. The wheel 16 may therefore be called a "locking, releasing, and driving wheel." Moreover, the wheels 16 and 19 are so constructed and fitted to each other that the former may be turned backward and so operate the counter-wheels, springs, and connected gearing backward without damage or strain to any of the parts. This is a useful feature and prevents injury to the register by casual attempts to work its gears backward or in reverse.

It is preferred, but of course not essential to use the dials 36, 37, and 38 with their hands; but they will be found advantageous in case the springs 39 and 40 should break or in cases where the springs are omitted altogether, as might be done where the register is used in a water-meter. The visual counter-wheels may be variously arranged so as to alternately expose and obscure their counting characters. For example, each of them might be made in the form of a disk having an aperture which as the wheel rotates exposes and obscures its counting characters fixed on a rear stationary plate, or the counting characters may be located on the peripheries of the counter-wheels and exposed and obscured at windows in the face-plate; but the arrangement shown in the drawings is preferred. The snap action of the counter-wheels is of great utility, because it insures an accurate and ready reading of the register even by the unskilled, and the mechanism is so constructed and arranged that the additional load thus put upon the initial spindle is so slight and is so equally distributed as to be scarcely felt.

While I have shown my invention in its preferred form and arrangement, it is to be understood that various changes may be made without departing from the scope of the invention.

What I claim, and desire to secure by Letters Patent, is—

1. In a register for measuring purposes, the combination of a plurality of intermittently-moving snap-acting visual counter-wheels; mechanism for driving said counter-wheels and actuated by the fluid to be measured; a spring energized and intermittently released by said mechanism to impart a snap action to said counter-wheels, said counter-wheels being connected in a train of gearing so that a predetermined movement of one counter-wheel imparts movement to the next.

2. In a register for measuring purposes, the combination of a plurality of intermittently-moving snap-acting visual counter-wheels; mechanism for driving said counter-wheels and actuated by the fluid to be measured; a spring energized and intermittently released by said mechanism to impart a snap action to said counter-wheels, said counter-wheels being connected in a train of gearing so that a predetermined movement of one counter-wheel imparts movement to the next, and said mechanism, spring and counter-wheels being so connected and arranged as to be capable of reverse action.

3. In a register for measuring purposes, the combination of mechanism actuated by the fluid to be measured; a plurality of visual counter-wheels connected in a train of gearing so that a predetermined movement of one counter-wheel imparts movement to the next; a pair of intermittently-meshing gear-wheels interposed between said mechanism and counter-wheels; a spring intermittently energized and released to impart an intermittent snap movement to the second member of said pair of gear-wheels and thereby operating to impart a like movement to said counter-wheels, said pair of wheels being so connected that the first may positively drive the second in case the spring fails to operate.

4. In a register for measuring purposes, the combination of a plurality of visual, intermittently-moving, snap-acting counter-wheels; a gear-wheel for actuating said counter-wheels; a spindle provided with a locking and releasing wheel free to make a partial rotation on its spindle and engaging said gear-wheel; and a spring to actuate said gear-wheel when it is released by its said locking-wheel and thereby impart a snap movement to the counter-wheels, said locking and releasing wheel being arranged to positively drive the wheel it engages in case the springs fail.

5. In a register for measuring purposes, the combination of a plurality of visual, intermittently-moving, snap-acting counter-wheels; a gear-wheel for actuating said counter-wheels; a spindle provided with a locking and releasing wheel free to make a partial rotation on its spindle and engaging said gear-wheel; a spring to actuate said gear-wheel when it is released by its said locking-wheel and thereby impart a snap movement to the counter-wheels; and mechanism for storing energy in said spring and simultaneously driving said spindle, said locking and releasing wheel being arranged to positively drive the wheel it engages in case the springs fail.

6. In a register for measuring purposes, the combination of a plurality of visual, intermittently-moving, snap-acting counter-wheels connected in a train of gearing so that a predetermined movement of one counter-wheel imparts movement to the next; a gear-wheel for actuating said counter-wheels; a spindle provided with a locking and releasing wheel free to make a partial rotation on its spindle and engaging said gear-wheel; and a spring to actuate said gear-wheel when it is released by its said locking-wheel and thereby impart a snap movement to the counter-wheels, said locking and releasing wheel being arranged to positively drive the wheel it engages in case the springs fail.

7. In a register for measuring purposes, a train of gears comprising in combination of a spindle carrying a gear-wheel and a partially-toothed wheel; a pinion engaged by said partially-toothed wheel; a gear-wheel engaged by said pinion; a second pinion engaging the first-mentioned gear-wheel; and a partially-toothed wheel engaging said last-mentioned pinion, said partially-toothed wheels having smooth portions which operate to lock their respective coöperating pinions when the teeth of said wheels are out of mesh therewith, each of said pinions having a single set of teeth engaged by both its driving and driven wheels and arranged to make a complete rotation at each actuation from its driving-wheel.

8. In a register for measuring purposes, a train of gears comprising in combination of a spindle carrying a gear-wheel and a partially-toothed wheel; a pinion engaged by said partially-toothed wheel; a gear-wheel engaged by said pinion; a second pinion engaging the first-mentioned gear-wheel; a partially-toothed wheel engaging said last-mentioned pinion, said partially-toothed wheels having smooth portions which operate to lock their respective coöperating pinions when the teeth of said wheels are out of mesh therewith, each of said pinions having a single set of teeth engaged by both its driving and driven wheels and arranged to make a complete rotation at each actuation from its driving-wheel; and mechanism including a spring whose power is intermittently stored and released for imparting an intermittent snap movement to said train of gears.

In testimony whereof I have signed my name to this specification in the presence of two subscribing witnesses.

ALBERT R. BEAL.

Witnesses:
NICHOLAS M. GOODLETT, Jr.,
FRANK J. McBARRON.